United States Patent
Zuckerman et al.

(10) Patent No.: US 9,323,768 B2
(45) Date of Patent: Apr. 26, 2016

(54) ANTICIPATORILY RETRIEVING INFORMATION IN RESPONSE TO A QUERY OF A DIRECTORY

(71) Applicant: Hewlett-Packard Development Company, L.P., Houston, TX (US)

(72) Inventors: Boris Zuckerman, Marblehead, MA (US); Bret A McKee, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 192 days.

(21) Appl. No.: 13/754,054

(22) Filed: Jan. 30, 2013

(65) Prior Publication Data

US 2014/0214889 A1 Jul. 31, 2014

(51) Int. Cl.
*G06F 7/00* (2006.01)
*G06F 17/30* (2006.01)

(52) U.S. Cl.
CPC .... *G06F 17/30094* (2013.01); *G06F 17/30106* (2013.01); *G06F 17/30203* (2013.01)

(58) Field of Classification Search
CPC ............ G06F 17/30194; G06F 17/302; G06F 17/30203
USPC .................................................. 707/770, 966
See application file for complete search history.

(56) References Cited

U.S. PATENT DOCUMENTS

| | | | |
|---|---|---|---|
| 5,893,086 A * | 4/1999 | Schmuck et al. | |
| 6,493,810 B1 * | 12/2002 | Pang et al. | 711/170 |
| 6,507,849 B1 * | 1/2003 | Choudhary | |
| 6,782,389 B1 | 8/2004 | Chrin et al. | |
| 6,965,903 B1 * | 11/2005 | Agarwal et al. | |
| 7,430,570 B1 | 9/2008 | Srinivasan et al. | |
| 7,546,319 B1 | 6/2009 | Srinivasan et al. | |
| 7,650,341 B1 | 1/2010 | Oratovsky et al. | |
| 8,032,643 B2 * | 10/2011 | Gill et al. | 709/229 |
| 8,112,395 B2 | 2/2012 | Patel et al. | |
| 2005/0246323 A1 * | 11/2005 | Becher et al. | 707/3 |
| 2005/0283468 A1 * | 12/2005 | Kamvar et al. | 707/3 |
| 2009/0319475 A1 * | 12/2009 | Bestgen et al. | 707/2 |
| 2010/0174690 A1 * | 7/2010 | Marcotte | 707/695 |
| 2011/0145307 A1 | 6/2011 | Ananthanarayanan et al. | |

OTHER PUBLICATIONS

Meshramm, V. et al., "Can a Decentralized Metadata Service Layer Benefit Parallel Filesystems?," http://www.mcs.anl.gov/events/workshops/iasds11/papers/besseron:decentralized_metadata.pdf, 2011.

Badros, G., "Readdir-ahead", Apr. 23, 1998, downloaded from http://www.badros.com/greg/doc/enhanced-linux-nfs-client/node13.html on Nov. 13, 2015.

Siyao, L, "Metadata Stat-ahead HLD", Mar. 16, 2007, downloaded from http://wiki.old.lustre.org/images/f/f2/Md-statahead-hld.pdf on Nov. 13, 2015.

Zhang, I, "Efficient File Distribution in a Flexible, Wide-area File System", Massachusetts Institute of Technology, Jun. 2009.

(Continued)

*Primary Examiner* — Cheyne D Ly

(74) *Attorney, Agent, or Firm* — Tong, Rea, Bentley & Kim, LLC

(57) ABSTRACT

A technique includes receiving a query to a directory in a file system. In response to the query, both information targeted by the query and additional information are retrieved in anticipation of another query for the additional information.

9 Claims, 7 Drawing Sheets

(56) References Cited

OTHER PUBLICATIONS

Gu et al., "A Novel Weighted-Graph-Based Grouping Algorithm for Metadata Prefetching", DigitalCommons@University of Nebraska-Lincoln, CSE Journal Articles, Jan. 1, 2010.

Liu et al., "Prefetching and Caching Metadata in a Distributed NFS Server", downloaded from http://iacoma.cs.uiuc.edu/~liuwei/papers/prefetch.ps. on Nov. 13, 2015.

Zhu et al., "HBA: Distributed Metadata Management for Large Cluster-Based Storage Systems", IEEE Transactions on Parallel and Distributed Systems, vol.19, No. 4, Apr. 2008.

\* cited by examiner

ANTICIPATORILY RETRIEVING INFORMATION IN RESPONSE TO A QUERY OF A DIRECTORY

BACKGROUND

Data stored in a storage system can be organized into files and directories of a file system. A large storage system typically has a large number of computer nodes. As a result, information associated with the file system can be a distributed across the computer nodes. Performing certain operations in a distributed file system can be complex and can result in inefficiency if not performed properly.

DETAILED DESCRIPTION

Figure 1:
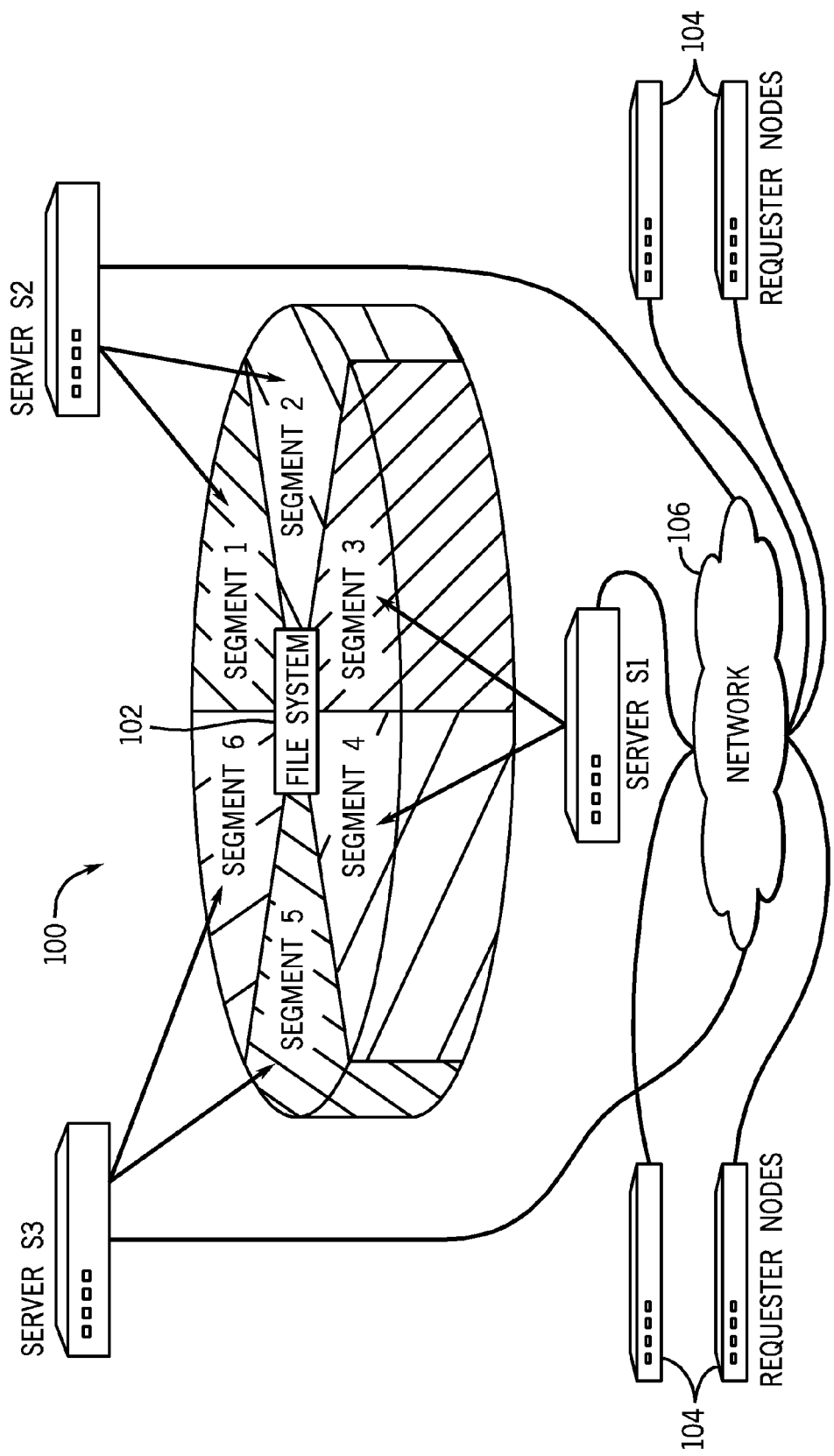
FIGS. 1 and 2 are schematic diagrams of distributed storage systems according to example implementations.

FIG. 1 illustrates a distributed storage system 100 that includes a distributed file system 102. The distributed file system 102 is divided into multiple logical segments (identified as segments 1-6 in the example of FIG. 1). Multiple server computers (e.g., server S1, server S2 and server S3), which are part of the distributed storage system 100, manage respective groups of the segments. For example, server S1 manages segments 3 and 4, server S2 manages segments 1 and 2, and server S3 manages segments 5 and 6. The number of segments managed by each respective server can vary and can change over time. As used here, the term "segment server computer" or "server" refers to any computing entity that manages one or multiple segments.

A "segment" typically includes data in a contiguous range of a storage medium, up to some predefined maximum size. A "segment" is used to maintain a collection of file system entities, including inodes (file system entities can be in the form of files, parts of files, and directories). A first segment can refer to file system entities (e.g. files and/or directories) in another segment.

Each segment server (S1, S2, or S3) is responsible for allocation of blocks and inodes within the boundaries of the respective individual segment managed by the respective segment server. A file system entity includes one or multiple blocks of data, where each block is a predefined region of storage. An inode is a data structure that stores information about a file system entity, such as a file or directory. Examples of information contained in an inode include the following information regarding the respective file system entity: type, length, access and modification times, location on a storage medium, owner, permissions, etc. Note that an inode does not contain the actual data of the corresponding file system entity (e.g. the inode for a file does not contain the data for the file).

The amount of storage that is "owned" by a segment server can be controlled. By allocating specific number(s) of segments to a segment server, an amount of storage owned by the segment server corresponds to a number of file system entities that the segments server controls. The division of a distributed file system into served segments that are associated with respective segment servers allows for the distributed file system 102 to scale linearly. As more segments added to the file system 102, correspondingly more segment servers can also be added. Additionally, network entry points to the segment servers can also be increased correspondingly.

Although just three segment servers (and associated six segments) are shown in FIG. 1, note that an actual distributed storage system can include a much larger number of segment servers and respective segments. For example, the distributed file system 102 can include thousands of segments. In some examples, at any given time, each individual segment is exclusively controlled by a corresponding one segment server. For load balancing and/or fault tolerance, the control of any given segment can be migrated from one segment server to another segment server.

FIG. 1 further depicts various requester nodes 104 that are coupled over a data network 106 (e.g. local area network, storage area network, wide area network, public network, etc.) to the servers S1, S2, and S3. Examples of the requester nodes 104 include client computers (e.g., desktop computers, notebook computers, etc.) associated with users. Alternatively, the requester nodes 104 can include segment servers that have to retrieve data served by other segment servers in the distributed file system 102.

Figure 2:
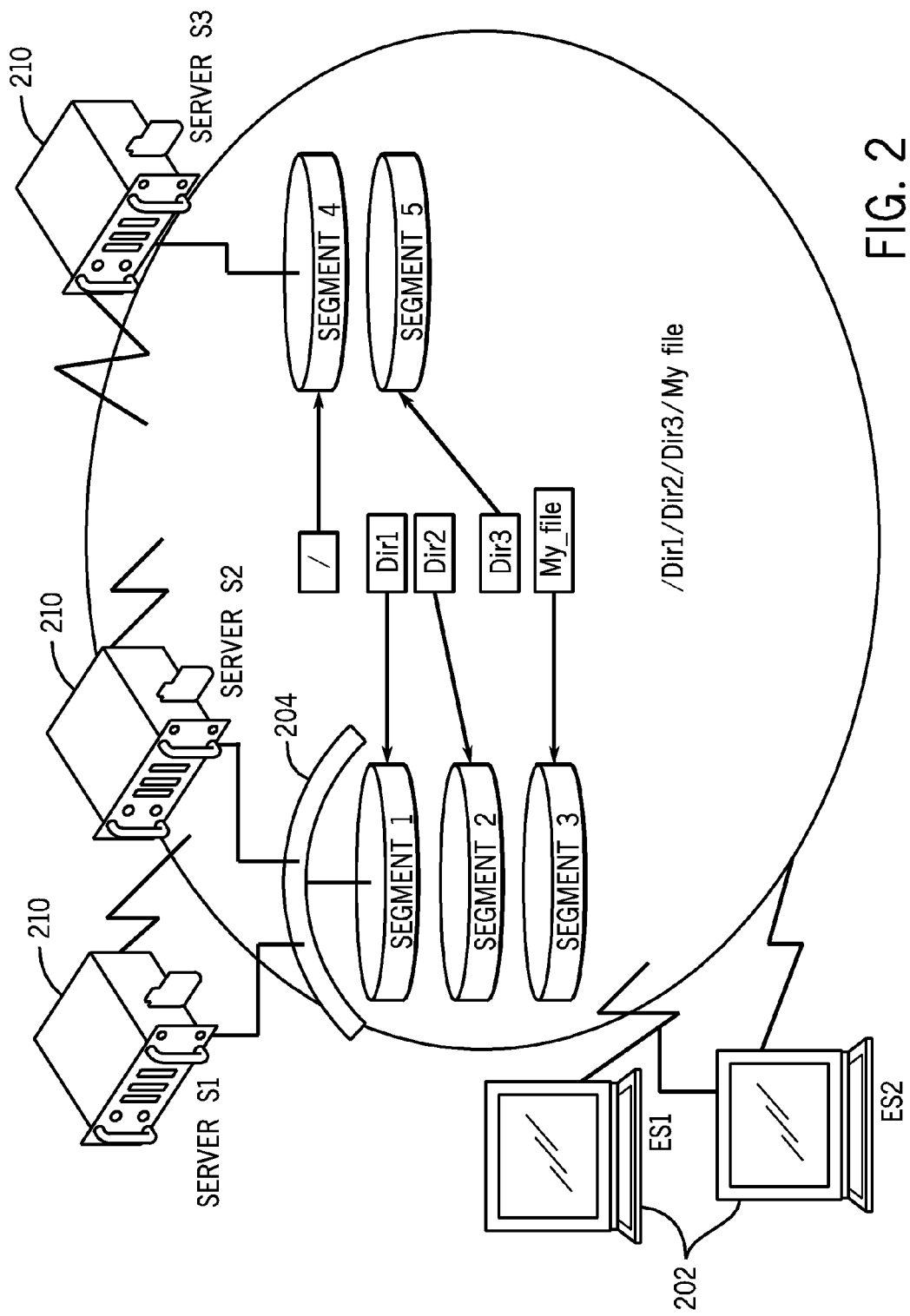

As further shown in an example arrangement in FIG. 2, the various computing entities depicted in FIG. 1 can be classified as being destination servers (DS) or entry point servers (ES). Certain computing nodes can be both destination servers and entry point servers. In the example of FIG. 2, servers S1, S2, and S3 can be both entry point servers and destination servers. However, computing nodes 202 (which can correspond to the requester nodes 104 shown in FIG. 1) are considered entry point servers (ES1 and ES2 in the example of FIG. 2).

A destination server (also interchangeably referred to as a "segment server") serves as a final destination for management of files, directories, or other file system entities. The destination servers manage respective sets of segments. For most file system operations, entry point servers send requests to destination servers to perform respective operations. The association between segments and destination servers is made available to computing nodes (such as entry point servers) that are able to access the distributed file system.

A destination server can be connected to segments directly or through a network 204, which can be implemented with one or some combination of: Fibre Channel (FC) interconnects, Internet Small Computer System Interface (iSCSI) interconnects, serial attached SCSI (SAS) interconnects, or other types of interconnects. An entry point server can run applications or provide access to the distributed file system through protocols such as the Network File System (NFS) protocol, Server Message Block (SMB) protocol, Hypertext Transfer Protocol (HTTP), File Transfer Protocol (FTP), and so forth.

The distributed file system implemented with the arrangement shown in FIG. 2 is a hierarchically-arranged file system. A "hierarchically arranged file system" refers to a file system that includes file system entities at different levels in a hierarchy. The hierarchy includes a file at the lowest level, and directories at various intermediate levels and the root level. To achieve a high degree of parallelism, individual entities of the hierarchically arranged file system can be widely distributed across many segments that are correspondingly controlled and served by different destination servers.

For example, as shown in FIG. 2, a file path /Dir1/Dir2/Dir3/My_file indicates that the file My_file is located in a directory Dir3, which in turn is located in directory Dir2, which in turn is located in directory Dir1, which in turn is located under the root directory /. In this example path name, file system entities are represented at five different hierarchal levels, where My_file is at the lowest hierarchal level, while the root/is at the highest hierarchal level.

FIG. 2 illustrates how individual elements of the file My_file associated with the path name /Dir1/Dir2/Dir3/My_file are placed in five different segments (segments 1-5) shown in FIG. 2, and controlled or served by three different destination servers (S1, S2, and S3). To execute an operation with respect to the file My_file, an entry point server may have to request services of various destination servers that control respective segments associated with the entities (/, Dir1, Dir2, Dir3, My_file) in the path name /Dir1/Dir2/Dir3/My_file.

As another example, an entry point server performing the creation of a new file may decide to place the new file in segment 5, and may have to register the new file's name in directory Dir2 in segment 2. In this case, the entry point server making the new file creation request requests services of destination server S3 to create the new file and services of destination server S2 to link the file into directory Dir2. Other file system operations may involve more file system objects or more segments, and thus may involve an even greater degree of coordination among the larger number of destination servers. However, the fundamental idea behind scalability in such highly parallel distributed file system environment is in reducing the scope of individual operations to a few objects and few servers.

A user client may submit a query of a directory (also called a "query directory" or "query for directory information" herein) of the distributed file system for purposes of receiving information (a tree structure or partial tree structure of the directory, attributes of files of the directory, and so forth) pertaining to the directory. As an example, for a query of a directory of a network file system (NFS) server, a client may submit a READDIR query to acquire information pertaining to a certain directory structure. Because the buffer of the client may be relatively small, as compared to the number of files in the targeted directory, the query typically is limited by the client to a certain portion of the targeted directory. Therefore, for purposes of reading an entire directory, for example, a user client may submit a series of queries for directory information, where each query targets a different portion of the targeted directory. Although the queries may be submitted serially to the distributed file system, in accordance with example implementations disclosed herein, the distributed file system retrieves directory information in anticipation of at least some of these queries. This feature allows more efficient processing of the queries which takes advantage of the parallel processing capabilities of the distributed file system, as further disclosed herein.

In this manner, when an entry point server of the file system processes a query that targets information pertaining to a given portion of a directory, the entry point server assumes that additional queries are forthcoming from the user client for additional portions of the directory. Based on this assumption, the entry point server retrieves the additional information, taking advantage of, for example, the relatively high bandwidth and time efficient parallel accesses to the storage segments of the file system. With this approach, the entry point server may more efficiently respond to the query request from the user client.

More specifically, it is not uncommon for an application on a system message block (SMB) or NFS server to invoke file system services to perform directory queries to obtain the complete contents of a directory. Therefore, in accordance with example implementations, the distributed file system may continue reading about the directory on its own after returning a first portion to a requesting application of the client. Moreover, when processing such a query, the file system may perform some transformations from internal formats into formats that are requested in the query call. Data in internal formats is placed in the file system's managed cache. The time efficiency gain is especially important for the case of a distributed parallel segmented file system, where an entry point server (receiving the client request) may request data from another server (i.e., a destination server).

Figure 4:
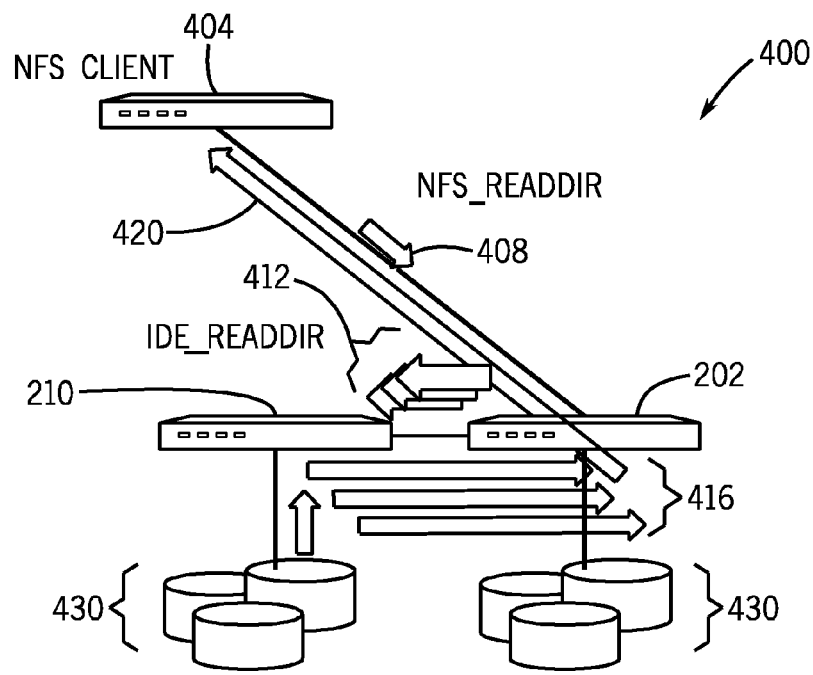
FIG. 4 is a schematic diagram depicting a system to process a query of a directory according to an example implementation.

As a more specific example, FIG. 4 depicts a system 400 in which an NFS client 404 to the file system sends a READDIR query 408 for part of the overall data describing a part of a directory. In response to the query 408, an entry point server 202 communicates multiple parallel READDIR requests 412, which results in multiple replies 416 to retrieve corresponding data from storage devices 430 of one or multiple destination servers 210 to place data in the cache of the entry point server 202.

It is noted that although a distributed file system is specifically disclosed herein, which relies on communications over network fabric with storage segments, the techniques and systems that are disclosed herein may likewise be applied to storage system in which the server and its storage are local (and thus, do not use network communications to store and retrieve storage information). Thus, many implementations are contemplated, which are within the scope of the appended claims.

Figure 3:
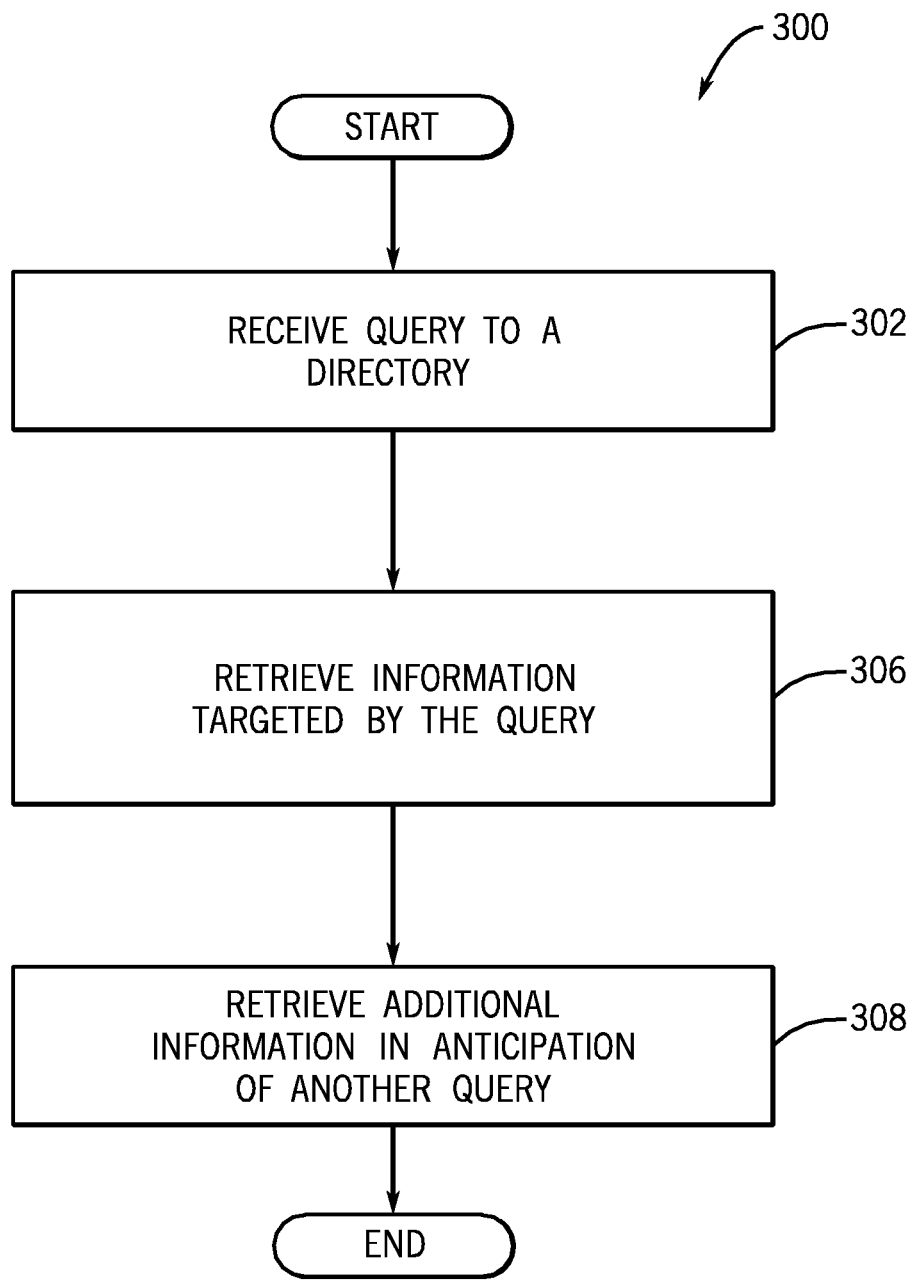
FIG. 3 is a flow diagram depicting a technique to anticipatorily retrieve information in response to a query of a directory according to an example implementation.

Thus, referring to FIG. 3, in accordance with an example implementation, a technique 300 includes receiving (block 302) a query of a directory and retrieving directory information targeted by the query, pursuant to block 306. The technique 300 also includes, in response to the query, retrieving additional information in anticipation of another query, pursuant to block 308.

Figure 5:
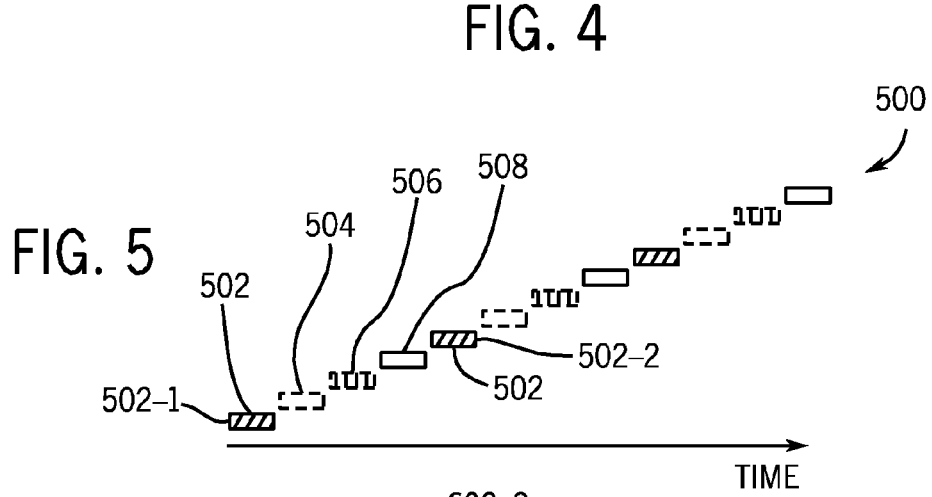
FIG. 5 depicts a timeline illustrating processing of queries of directories in a non-overlapping manner.
Figure 6:
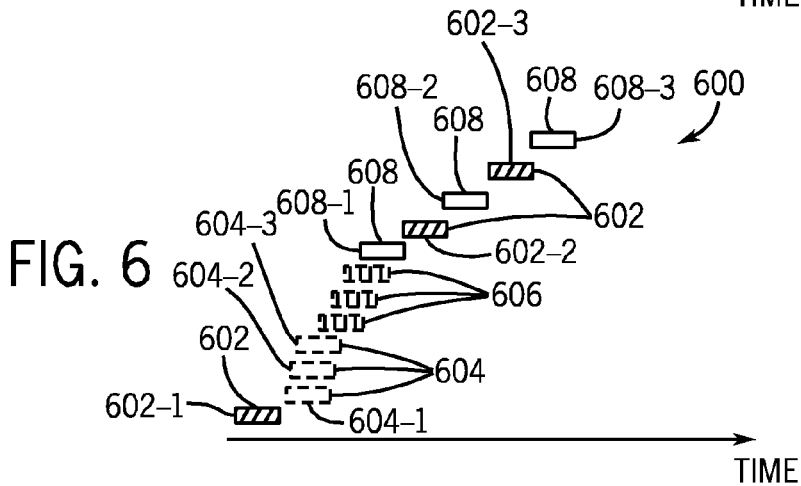
FIG. 6 is a timeline illustrating processing of queries of directories in an overlapping manner according to an example implementation.

FIGS. 5 and 6 illustrate timelines involved with non-overlapping (FIG. 5) and overlapping (FIG. 6) processing of directory queries. In this regard, FIG. 5 depicts an exemplary timeline 500 in which a NFS entry point server retrieves data in response to client READDIR queries 502 in the order that the queries 502 are received. Thus, a given READDIR query 502 results in a corresponding given READDIRR query 504 in the storage system, which then results in a READDIR reply 506 to return the requested information. Each READDIR query 502 therefore results in a corresponding READDIR reply 506 before the next READDIR query 502 is processed.

In contrast to this strictly serial processing, FIG. 6 depicts an exemplary timeline 600 using anticipatory queries in the storage system. In this manner, pursuant to the timeline 600, the entry point server receives a READDIR query 602-1 and communicates a corresponding READDIR query 604-1 to retrieve the requested information from the storage system, as well as, for this example, two additional storage system READDIR queries 604-2 and 604-3 in anticipation of future client READDIR queries 602-2 and 602-3. For example, the READDIR query 602-1 may target a first segment of a directory tree; and the file system anticipates future client READDIR queries 602-2 and 602-3 that target the next two successive segments of the directory tree. Thus, as depicted in FIG. 6, when the client actually communicates, the READDIR queries 602-2 and 602-3, the entry point server already has the associated data and may therefore readily provide the corresponding replies 608-2 and 608-3.

In accordance with further implementations, the entry point server may anticipatorily retrieve information other than directory information in response to a query to a directory. For example, in accordance with further implementations, a client application may also be interested in supplementing directory information with attributes of individual objects that are listed in the directory, such as the case, for example, when an NFS server replies to an NFS READDIRPLUS call. More specifically, the tendency of a particular client to request attribute information may be determined, in accordance with some implementations, by recording a time of the last READDIR request from that client as a field in the directory in-core representation in comparing this time with a time of the lookup. Thus, in essence, the entry point server may compare a timeline of one or more actual requests with a historical pattern to determine if the server should anticipatorily retrieve attribute information in response to a query for directory information. Continuing the example, if the times of the last READDIR request and the time of the last attribute lookup are sufficiently close in time, then the entry point server may, in accordance with example implementations, anticipatorily retrieve attribute information is stored in the entry point server's cache after receiving a directory inquiry.

Figure 7:
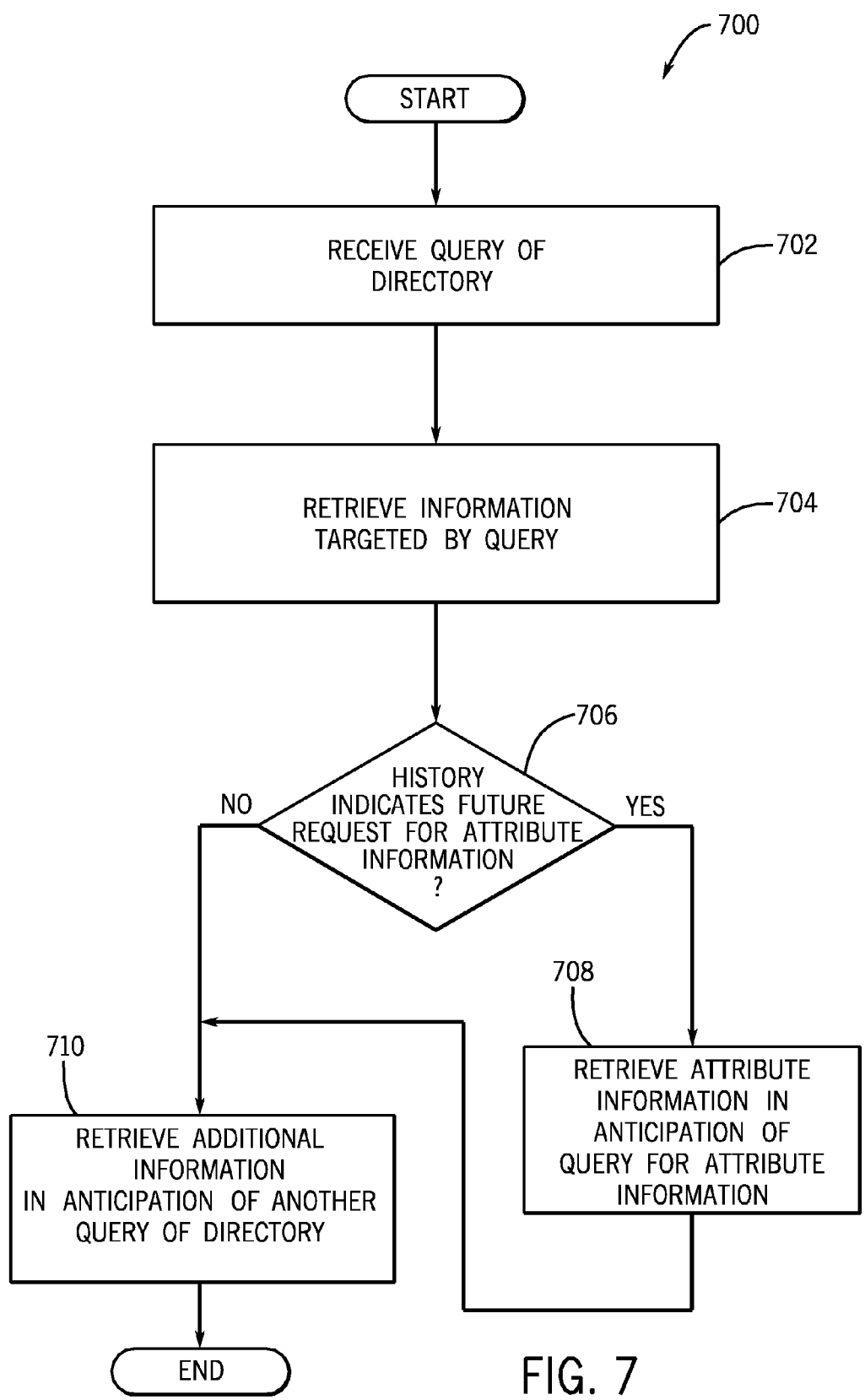
FIG. 7 is a flow diagram depicting a technique to anticipatorily retrieve directory information and attribute information in response to a query of a directory according to an example implementation.

Thus, referring to FIG. 7, in accordance with some implementations, a technique 700 includes receiving (block 702) a query to a directory and retrieving (block 704) the directory information targeted by the query. If a determination is made (decision block 706) that a history indicates an upcoming request for attribute information, then the attribute information is retrieved in anticipation of a query for the attribute information, pursuant to block 708. Regardless of whether the attribute information is retrieved or not, the technique 700 further includes, in accordance with example implementations, retrieving (block 710) additional directory information in anticipation of another query to the directory.

Other variations are contemplated and are within the scope of the appended claims. For example, as mentioned above, the techniques and systems that are disclosed herein may apply to local file storage, as well as file storage that occurs over a network. As another example, in accordance with example implementations, in response to retrieving attribute information for a single file, in accordance with some implementations, the entry point server may request information for multiples files (additional files located in the same directory, for example), thereby consolidating the request into a single message which reduces network traffic. Other variations are contemplated, which are within the scope of the appended claims.

Figure 8:
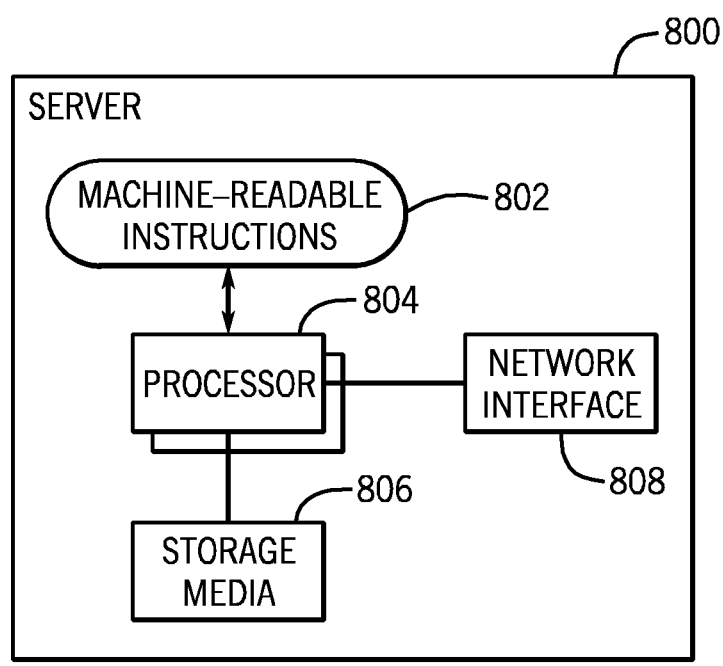
FIG. 8 is a schematic diagram of a server according to an example implementation.

The queries for directory information may be processed as disclosed herein either by a distributed file system or by a non-distributed file system, depending on the particular implementation. As an example of the non-distributed case, FIG. 8 is a block diagram of an example server 800, which can be an entry point server or a destination server, in accordance with example implementations. The server 800 includes machine-readable instructions 802 executable on one or multiple processors 804. The processor(s) is (are) connected to machine-readable storage media 806, and to a network interface 808 that allows the server 800 to communicate over a network.

A processor can include a microprocessor, microcontroller, processor module or subsystem, programmable integrated circuit, programmable gate array, or another control or computing device.

The machine-readable (or computer-readable) storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Figure 9:
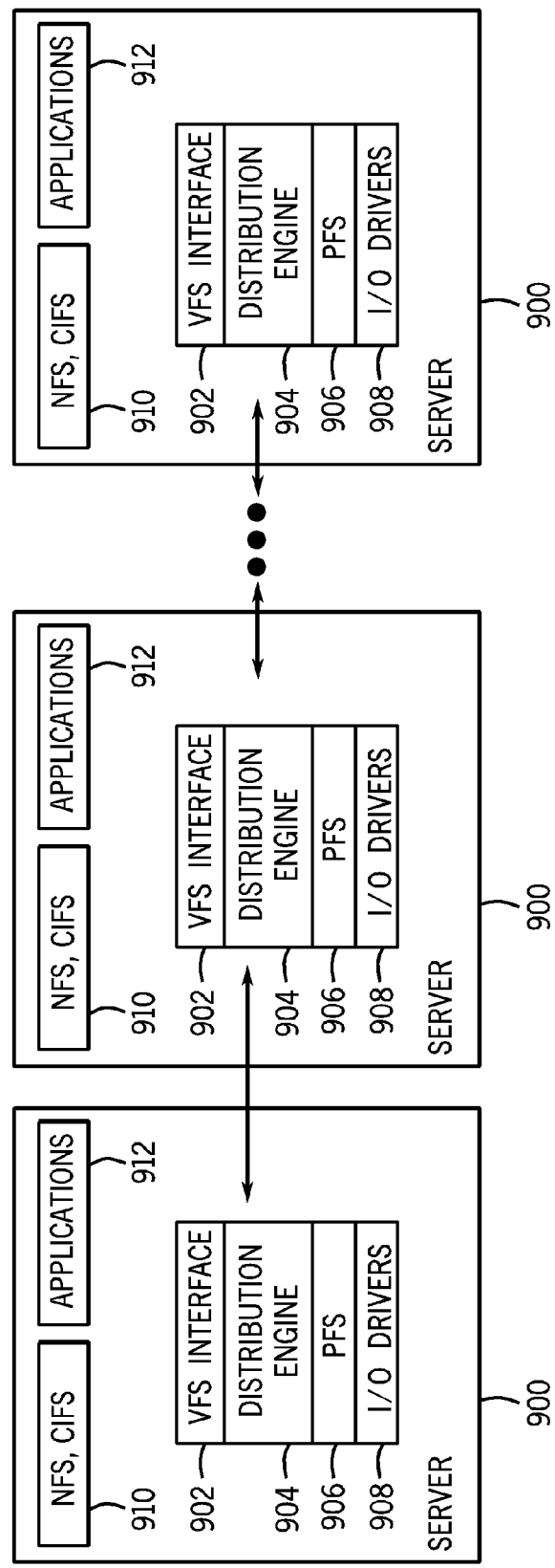
FIG. 9 is a schematic diagram of components in a distributed arrangement of servers according to an example implementation.

FIG. 9 is a block diagram of example components of a distributed arrangement of servers 900, which is one of many example systems that may be employed for purposes of processing queries for directory information on a distributed file system. For this example, each of the servers 900 includes applications 912 that are executable in the respective servers 900. In addition, each server 900 includes a distributed file system 910, such as a network file system (NFS) or common Internet file system (CIFS).

Each server 900 also includes a stack that has a virtual file system (VFS) interface 902, a distribution engine 904, a physical file system (PFS) 906, and input/output (I/O) drivers 908. Other components not shown can also be part of the stack in each server 900. Note also that the distributed file system 910 can also considered to be part of the stack.

The VFS interface 902 allows the applications 912 to access different types of file systems. The physical file system 906 in each server 900 manages on-disk structures, performs in-memory caching of local file system entities, performs segment-level snapshots, responds to directory and attribute queries and/or other tasks.

The distribution engine 904 performs remote session management (with other servers), provides distributed cache coherence, performs load balancing migration, manages distributed snapshots, responds to directory and attribute queries, and/or other tasks.

While a limited number of examples have been disclosed herein, those skilled in the art, having the benefit of this disclosure, will appreciate numerous modifications and variations therefrom. It is intended that the appended claims cover all such modifications and variations.

What is claimed is:
1. A method comprising:
receiving, by a processor, a series of queries to a directory in a distributed file system, wherein the series of queries targets different portions of the directory, wherein the receiving the series of queries comprises receiving the series of queries in a cache of a first server of the distributed file system; and in response to the series of queries, retrieving, by the processor, both information targeted by a first query of the series of queries and additional information in anticipation of another query of the series of queries for the additional information, wherein the retrieving comprises retrieving at least one of: the information targeted by the first query and the additional information, from a second server of the distributed file system ahead of the another request for the additional information, wherein the information targeted by the first query comprises information about the directory of the distributed file system, wherein the additional information comprises information about at least an attribute of an object contained in the directory, wherein the retrieving the additional information in anticipation of the another query of the series of queries is based on a comparison of the first query to a historical query pattern and retrieving the additional information that comprises information about the at least the attribute of the object contained in the directory based on a time associated with the first query compared to recorded information about a timing of previous attribute queries and previous queries about the directory in the distributed file system.

2. The method of claim 1, wherein the information targeted by the first query and the additional information describe different parts of a directory structure of the directory.

3. The method of claim 1, further comprising:
consolidating the series of queries to generate a consolidated query.

4. A distributed storage system comprising:
a plurality of segment servers to manage respective segments of file system entities of a distributed file system; and an entry point server to receive a series of queries to a directory from a client of the distributed file system, wherein the series of queries targets different portions of the directory and in response to the series of queries, retrieve both information targeted by a first query of the series of queries and additional information in anticipation of another query of the series of queries from the client for the additional information, wherein the entry point server is adapted to retrieve at least one of: the information targeted by the first query and the additional information, from one of the plurality of segment servers, the one of the plurality of segment servers being a different server than the entry point server, wherein the information targeted by the first query comprises information about the directory of the distributed file system, wherein the additional information comprises information about at least an attribute of an object contained in the directory, wherein the entry point server retrieves the additional information in anticipation of the another query of the series of queries is based on a comparison of the first query to a historical query pattern and retrieves the additional information that comprises information about the at least the attribute of the object contained in the directory based on a time associated with the first query compared to recorded information about a timing of previous attribute queries and previous queries about the directory in the distributed file system.

5. The system of claim 4, wherein the information targeted by the first query and the additional information describe different parts of a directory structure of the directory.

6. The system of claim 4, wherein the distributed file system comprises a distributed segmented and parallel file system.

7. An article comprising a non-transitory processor readable storage medium to store instructions that when executed by a processor-based system cause the processor-based system to:

receive a series of queries to a directory in a distributed file system, wherein the series of queries targets different portions of the directory, wherein the series of queries is received in a first server of the distributed file system; and in response to the series of queries, retrieve information targeted by a first query of the series of queries and additional information in anticipation of another query of the series of queries for the additional information, wherein at least one of: the information targeted by the first query and the additional information, is retrieved from a second server of the distributed file system, wherein the information targeted by the first query comprises information about the directory of the distributed file system, wherein the additional information comprises information about at least an attribute of an object contained in the directory, wherein the retrieving the additional information in anticipation of the another query of the series of queries is based on a comparison of the first query to a historical query pattern and retrieving the additional information that comprises information about the at least the attribute of the object contained in the directory based on a time associated with the first query compared to recorded information about a timing of previous attribute queries and previous queries about the directory in the distributed file system.

8. The article of claim 7, wherein the information targeted by the first query and the additional information describe different parts of a directory structure of the directory.

9. The article of claim 7, wherein the first server comprises an entry point server and the second server comprises at least one destination server to provide the information targeted by the first query and the additional information.

* * * * *